Oct. 25, 1966  H. P. ROBERTSON  3,280,661
TOOL FOR POSITIONING HOLES, AS IN GEAR PLATES AND THE LIKE
Filed Sept. 8, 1964  2 Sheets-Sheet 1
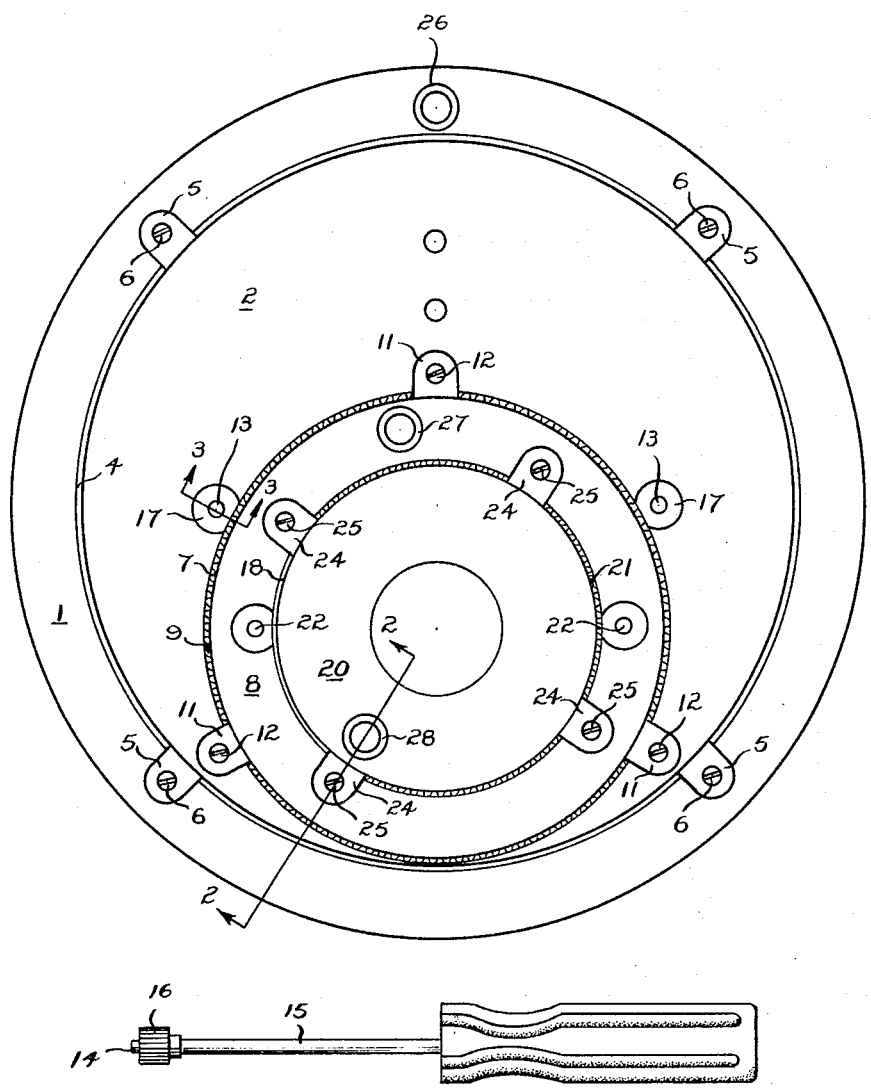
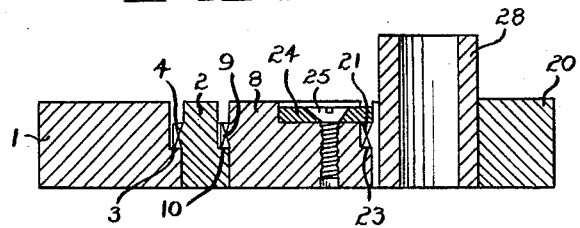
FIG 1
FIG 2

3,280,661
TOOL FOR POSITIONING HOLES, AS IN GEAR
PLATES AND THE LIKE
Hugh P. Robertson, 16 Pankala Road,
Para Hills, Australia
Filed Sept. 8, 1964, Ser. No. 394,849
Claims priority, application Australia, Sept. 12, 1963,
35,324/63
5 Claims. (Cl. 77—62)

This invention relates to an improved tool for positioning holes accurately in a drill jig without the use of expensive equipment such as a jig boring machine. At the same time it eliminates the necessity of working out co-ordinates when manufacturing drill jigs for gear plates of complicated synchro assembles as used for instance in servo computors and control equipment.

The tool the subject of this invention enables quick, accurate, on the spot modification on this type of equipment as well as allowing the original calculations and positionings to be selected.

The tool consists essentially of four members which are movable in relation to each other and three of which carry drill guides or similar mechanisms whereby the drill positions can be fixed.

Essentially the improved tool for positioning holes in gear plates and the like comprises an outer member having an aperture therein, a drill guide through the said outer member near one edge thereof, a first rotational member rotatably carried in the aperture of the said outer member having an aperture therein which is eccentrically disposed in the said member, a second rotational member rotatably carried in the said first rotational member having an aperture therethrough, a drill guide through the said second member near its outer edge, a third rotational member rotatably carried in the aperture of said second member, a drill guide through said third member near its outer edge, means to hold the outer member and the first and second and third members in co-planar relationship, and locking means between each of said members, the arrangement being such that the members can be rotated into appropriate position and then locked for drilling of a gear plate or the like.

Figure 3:
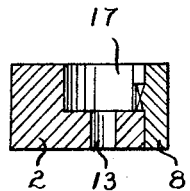
Figure 4:
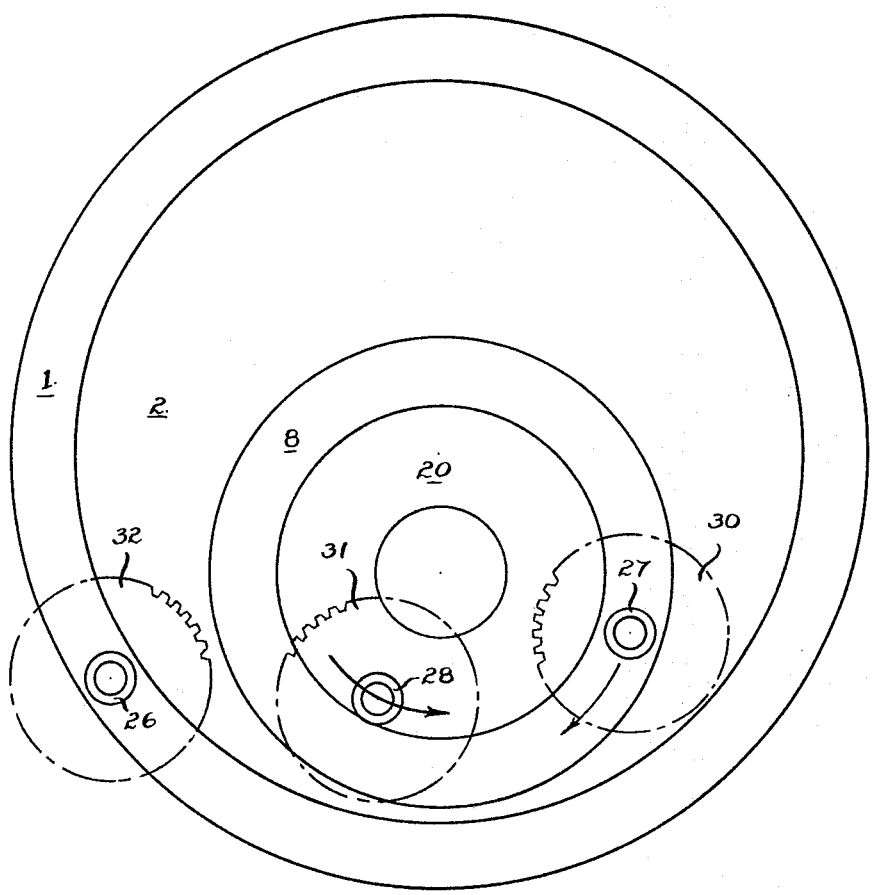

To enable the invention to be fully understood a preferred embodiment of same will now be described in some detail but it is to be realised that modifications of same may be effected within the spirit of this invention. The description will be made with reference to the accompanying drawings in which, FIG. 1 is a plan of the unit including the tool for operating same, FIG. 2 is an enlarged cross-section on line 2—2 of FIG. 1, FIG. 3 is an enlarged cross-section on line 3—3 of FIG. 1, and FIG. 4 is a schematic view of FIG. 1 showing three gear wheels being meshed.

The outer member 1 consists of a disc of metal or the like which is adapted to rotationally carry the first rotational member 2 of the mechanism, the shape of the outer member being immaterial although generally it is a relatively narrow disc-like member.

The aperture in this member must be such that the first rotational member 2 which is supported in it is capable of rotation within it, and the aperture of this outer member 1 is provided around its periphery with a circular ledge 3 so that a ring 4 which extends around the circumference of the first rotational members 2 can seat on it to allow co-planar positioning and orientation of the first rotational members 2 within the outer member 1, keepers 5 being provided in recesses in the outer member 1 to locate the ring 4 on the ledge 3 to allow it to rotate freely unless locked by forcing down the lugs 5 by means of the holding screws 6 which engage threaded apertures in the member 1.

The first rotational member 2 is provided with an aperture 7 which is eccentrically positioned within the disc 2 and is as near to one edge of same as possible, and into the aperture 7 of this main disc 2 is placed a second rotational member 8 which is provided with teeth 9 around its periphery and is guided in the first rotational member 2 by one side of the teeth resting on a ledge 10 in the aperture 7, so that is can rotate in same but will not leave the disc, the teeth being held on to the ledge 10 by keepers 11 held to the first rotational member 2 by screws 12 which can lock the teeth 9 down on the ledge 10 to provide a frictional hold.

The member 2 has a pair of sockets 13 to allow the stem 14 of an adjusting tool 15 to be inserted thereinto, the tool having a toothed pinion 16 thereon which fits into recess 17 in the first rotational member 2 which recess is deep enough to allow the pinion 17 to engage the teeth 9 and which thus allows rotation of the second rotational member by the adjusting tool 15. The reason why two sockets 13 are used is to ensure that one or other will be available and not covered by a gear wheel or the like during use of the invention.

This second rotational member 8 is provided with a coaxially positioned aperture 18, and the third rotational member 20 is located within the second rotational member 8 in a similar manner to the location of the second rotational member in the main member 2, the third rotational member 20 again having teeth 21 which can be engaged by the tool 15 engaged into one of the sockets 22 in the second rotational member 8, this rotational member 20 being again held in its correct plane by means of a ledge 23 in the member 20 which is engaged by one side of the teeth 21, keepers 24 held by screws 25 allowing this member also to be locked in relation to its supporting member 8 when required.

The outer member 1 as well as the second and third rotational members 8 and 20 are provided with drill guides 26, 27 and 28 respectively which may be apertures but preferably are hardened bushes as shown fixed into apertures, which are so arranged near their outer peripheries that after correct position has been selected the necessary drilling can be effected.

It will be realised that as the second and third rotational members 8 and 20 are coaxially located and that, as each has a drill guide, that is the guides 27 and 28, these two drill guides can be positioned at different centres according to the size of the gear wheels or similar mechanism which are to be meshed.

Similarly as the first rotational member 2 carries the second and third rotational members 8 and 20 eccentrically in relation to the outer member 1, and it is the outer member 1 which carries the third drill guide 26, a further accurate selection can be made of a third drilling position by simply moving either the two inner rotational members 8 and 20, that is the second or third members, in relation to the outer member 1 or by moving the first rotational member 2 to change the distance of the axis of the two inner members from the drill guide 26 on the outer member.

By use of four members arranged in this particular manner it is therefore possible to effect a selection of any required meshing of gears and to immediately drill to fix such positions, the fitting of the gears being effected either by placing the appropriate gears over the drill guides which are accurately sized for this purpose or by using slip gauges or the like between the drill bushes to ensure correct distancing of the guides.

As an example of how the device can be used for manufacturing a gearbox or similar mechanism, a pitch circle diameter drawing of the general layout is first prepared and a suitable position is then selected to start the drilling operation.

A hole is drilled and reamed in the drill jig in approximately the correct position.

The first two appropriate gear wheels 30 and 31 are now mounted on the drill guides 27 and 28 of the second and third rotational members 8 and 20 and the unit is adjusted by engaging the stem 14 of the adjusting tool 15 in one of the sockets 22 of the member 8 and turning the member 20 until the desired mesh is obtained, whereupon the members 8 and 20 are locked together in that position by tightening the screws 25 of the keepers 24.

A close fitting pin is now inserted through the one drill guide and hole in the drill jig, and the whole assembly is rotated until the other guide is in the required position on the plate whereupon the centre is drilled through this guide. Drilling and reaming can then go on in this way until the complete assembly has been finalised.

It will be realised however that instead of using only two gear wheels as stated it is possible to accurately mate a series of gear wheels on the three adjustable drill bushes and when the correct tolerances have been obtained the various discs are firmly locked together and the drill guides then allow the holes to be drilled. The member 8 may for instance be moved to mesh the gear wheel 31 with the gear wheel 32, the adjusting tool 15 being engaged in one of the sockets 13 of the member 2.

It will be realised that by means of this invention it is possible to select and drill a series of holes at accurately spaced relationships using either two of the adjustable drill guides or three of the drill guides for the more elaborate gear assembles.

The technique of using the device is especially useful for modifications to existing gearboxes.

What I claim is:

1. An improved tool for positioning holes in gear plates and the like comprising; an outer member having an aperture therein, a drill guide through said outer member, a first rotational member rotatably carried in the aperture of said outer member having an aperture therein which is eccentrically disposed in said member, a second rotational member rotatably carried in said first rotational member having an aperture therethrough, a drill guide through said second member near its outer edge, a third rotational member rotatably carried in the aperture of said second member, a drill guide through said third member near its outer edge, means to hold the outer member and the first and second and third members in co-planar relationship, and locking means between each of said members.

2. An improved tool according to claim 1 characterised by teeth on the periphery of at least the said second and third rotational members, and by sockets in at least the first and second rotational members adjacent to the teeth to allow one member to be rotated in relation to the other by engaging a toothed adjusting tool in a said socket in contact with the said teeth.

3. An improved tool according to claim 1 wherein the means to hold the members in co-planar relationship comprise a step on one of the co-engaging members and a circumferential ridge on the other co-engaging members, and keepers on the stepped member to hold the ridge down on to the said step.

4. An improved tool according to claim 1 wherein the means to hold the members in co-planar relationship comprise a step on one of the co-engaging members and a circumferential ridge on the other co-engaging member, and keepers on the stepped member to hold the ridge down on to the said step, and wherein the means for locking the said members together comprise screws which pass through the said keepers and engage the stepped member to urge the keepers down on to the said circumferential ridge.

5. An improved tool according to claim 1 wherein the means to hold the members in co-planar relationship comprise a step on one of the co-engaging members and a circumferential ridge on the other co-engaging member, and keepers on the stepped member to hold the ridge down on to the said step, and wherein the circumferential ridges of the second and the third rotational members are toothed and sockets are provided on the first and second rotational members, adjacent to the teeth to allow one member to be rotated in relation to the other by engaging a toothed adjusting tool in a said socket in contact with the said teeth.

References Cited by the Examiner
UNITED STATES PATENTS
2,232,374    2/1941    Drews _____ 77—62

FRANCIS S. HUSAR, *Primary Examiner.*